United States Patent Office 3,250,826
Patented May 10, 1966

3,250,826
THIOPHOSPHATE ESTERS
Saburo Tamura and Yusuke Sumiki, Tokyo, Japan, assignors to Yashima Kagaku Kogyo Kabushiki Kaisha, Kawasaki, Japan
No Drawing. Filed Feb. 15, 1961, Ser. No. 89,348
Claims priority, application Japan, Mar. 7, 1960, 35/7,601; Mar. 18, 1960, 35/9,285
6 Claims. (Cl. 260—940)

The present invention relates to cyano- and halogen-substituted phenyl thiophosphate esters having the general formula

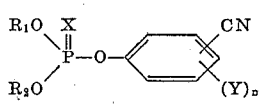

wherein $R_1$ and $R_2$ represent respectively an alkyl, aralkyl or aryl radical, X is sulphur or oxygen, Y is a halogen atom and $n$ denotes an integer not greater than 2, and is directed to insecticides comprising one or more of said compounds.

The novel compounds may be prepared by reacting monochlorophosphate or thiophosphate ester of the formula

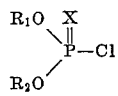

in which $R_1$, $R_2$ and X represent respectively the same radical and atom as mentioned above, with an alkali metal salt of cyano- and halogen-substituted phenol of the formula

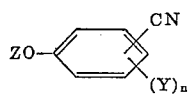

in which Y and $n$ respectively denote the same atom and integer as above-mentioned and Z represents an atom of alkali or alkali earth metals or ammonium radical.

Instead of using an isolated cyano- and halogen-substituted phenolate as a reactant, the corresponding phenol and a suitable substance for forming a phenolate such as alkali metals, their hydroxides, their carbonates and the like may be utilized.

The reaction is preferably carried out in an inert solvent such as acetone, methyl ethyl ketone, ethyl acetate, acetonitrile, dioxane, methanol, ethanol, benzene, toluene, xylene, chlorobenzene and the like.

The suitable temperature for performing said reaction generally ranges from 40° C. to 150° C. However, temperatures outside of such range may be used depending upon the actual reactants and solvents employed. In general, the preferable temperature is near the boiling point of the solvent used.

The required period of time for the reaction ranges approximately from 2 hours to 18 hours. With a solvent of the benzene series, it takes 10–15 hours and, with one of the ketone series, about 3–10 hours. When methyl ethyl ketone is used, the reaction is completed in 3–8 hours.

In accordance with the above-mentioned process, the following compounds, for example, may be prepared:

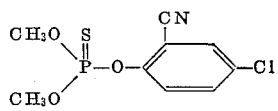

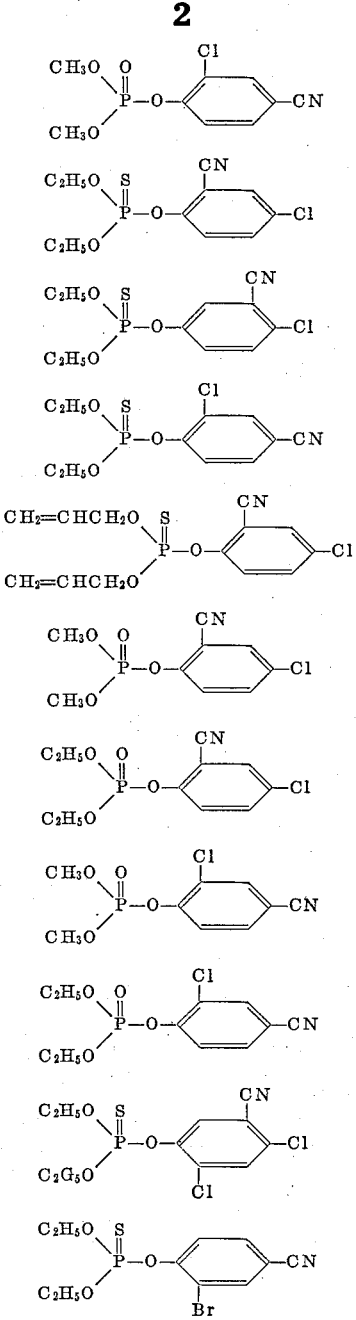

These compounds are difficulty soluble in water but soluble in many organic solvents including alcohols, ethers, ketones, esters, hydrocarbons, halogen derivatives thereof, animal and vegetable oils and the like.

It has been known that dialkyl-p-nitrophenyl thiophosphate ester have an excellent insecticidal power but are toxic to warm-blooded animals. We have now found that the aforesaid cyano- and halogen-substituted phenyl phosphate and thiophosphate esters match the toxicity of said dialkyl-p-nitrophenyl thiophosphate esters when employed as toxic ingredients in contact insecticides, ingested insecticides, fumigation insecticides and the like, and are far less toxic to warm-blooded animals when compared with the latter. The insecticidal power and the toxic effect of diethyl-p-cyanophenyl thiophosphate ester having no substituted halogen atom in its phenyl radical have been already disclosed (Robert L. Metcalf: Organic Insecticide, pages 251–305 and pages 255–260 (1955), published by Interscience Publishers, Inc.). However, the novel phosphate or thiophosphate esters according to this invention are more powerful insecticides and less toxic than said known thiophosphate ester.

The compounds according to this invention may be used in simple aqueous dispersion or incorporated in other conventional carriers such as solvents, oil-in-water emulsions, hydrated compositions, and the like. They may be also incorporated in finely powdered carriers such as talc, diatomaceous earth, caolin, bentonite, pyrophyllite and the like. The term "carrier" in this specification is to be construed as including solid, liquid and gaseous carriers. All liquids, in which the toxicant can be dissolved or dispersed with or without the aid of dispersing agents, emulsifying agents, wetting agents, penetrating agents or the like, are useful as liquid carriers. Water, alcohols, ethers, ketones, esters, aromatic and aliphatic hydrocarbons, halogenated hydrocarbons, animal and vegetable oils and the like are suitable examples. As gaseous carriers, air, nitrogen, carbon dioxide, methyl chloride, freon and like gasses may be utilized. They may be combined with the toxicant to prepare an aerosol insecticide.

Cyano- and halogen-substituted phenyl phosphate and thiophosphate esters incorporated in various kinds of carriers show superior insecticidal effect especially on the common cabbage worm or butterfly (*Pieris rapae curcivora*), rice stem borer (*Chilo suppressalis*), rice stem maggot (*Chlorps oryzae*), white-back plant hopper (*Sogata furcifera*), green rice leafhopper (*Nephotethix cincticeps*), house mosquito (*Culex pipiens pallens*), cabbage armyworm (*Manestra brassicae*), peach fruit moth (*Carposina niponensis*), pine ambrosia beetle (*Ips typographus*), citrus mealy bugs (*Pseudococcus citri*) and are also effective against various other insects.

The following examples further illustrate the invention, and also the superiority of the toxicants according to this invention over the aforesaid known toxicants as to insecticidal power and harmful effect to animals.

*Example 1*

38 grams of diethyl chlorothiophosphate, 35 grams of sodium p-chloro-o-cyano-phenolate and 200 cc. of methyl ethyl ketone were charged in a vessel equipped with an agitator and a reflux condenser and the mixture was heated at the boiling point of methyl ethyl ketone for 15 hours under stirring. The ketone was distilled off and 200 cc. of toluene and 50 cc. of water were added to the residue. After sufficient shaking, the toluene phase was separated. The toluene solution was washed with 5% aqueous solution of sodium carbonate and then with water. The washed solution was dried over anhydrous sodium sulfate. After toluene was distilled off, the residue was subjected to distillation under reduced pressure. Diethyl - (p-chloro-o-cyano-phenyl)-thiophosphate ester was obtained as a pale yellow oily substance, boiling at 132–136° C./0.2 mm., in a yield of 86%.

*Example 2*

250 cc. of anhydrous ethanol was put into a vessel equipped with a stirrer and a reflux condenser and 4.5 grams of metallic sodium was added. After the latter has been completely dissolved, 31 grams of o-chloro-p-cyano-phenol was added and stirred for 30 minutes. Then 38 grams of diethyl chlorothiophosphate was added and heated at the boiling point of said solvent for 8 hours under stirring. After ethanol has been distilled off, toluene and water were added to the residue and the mixture was treated in a similar way as in Example 1. Diethyl - (o-chloro-p-cyano-phenyl)-thiophosphate ester was obtained as a pale yellow oily substance, which solidified on standing, melting at 49–50° C. and boiling at 131–135° C./0.2 mm., in a yield of 79%.

The contact toxicities to house flies of diethyl-(p-chloro-o-cyano-phenyl)-thiophosphate ester (Example 1) (I) and diethyl - (o - chloro-p-cyano-phenyl)-thiophosphate ester (Example 2) (II) were compared with those of the aforesaid known dialkyl-p-nitrophenyl thiophosphate ester (III) and diethyl-p-cyano-phenyl thiophosphate ester (IV). The following table lists results of experiments in which 0.002%, 0.001%, 0.0005% and 0.00025% quantities of above said compounds I, II, III and IV respectively were used under comparable conditions, the values listed being the mortalities in percent after 24 hours.

| Compound | Concentration (percent) | | | |
|---|---|---|---|---|
| | 0.002 | 0.001 | 0.0005 | 0.00025 |
| I | 100.0 | 97.6 | 67.3 | 22.2 |
| II | 100.0 | 86.4 | 36.0 | 0 |
| III | 100.0 | 71.3 | 23.2 | 0 |
| IV | 100.0 | 100.0 | 72.7 | 26.9 |
| Control | 0 | 0 | 0 | 0 |

The oral toxicity of the several compounds to mice was also examined. The values in the following table respectively mean the 50% lethal dose i.e. $LD_{50}$ of each compound, in mg. per kg. of body weight, when each compound was given as a solution in peanut oil.

Compound:                                                                $LD_{50}$ (mg./kg.)

I ---------------------------------------- 90
II --------------------------------------- 90
III -------------------------------------- 60
IV --------------------------------------- 15

As will be understood from the above tables, the new thiophosphate esters have stronger insecticidal power and weaker toxic effects on warm-blooded animals than the heretofore known thiophosphate esters.

*Example 3*

18 g. of dimethyl monochlorothiophosphate, 15.3 g. of o-chloro-p-cyano-phenol, 10.5 g. of anhydrous sodium carbonate and 100 cc. of methyl ethyl ketone were charged in a vessel equipped with an agitator and a reflux condenser and the mixture was heated at the boiling temperature of the solvent for 8 hours under stirring. After the reaction mixture was cooled down, sodium chloride and sodium bicarbonate were filtered off and the filtrate was subjected to a reduced pressure distillation to remove methyl ethyl ketone. The residue was dissolved in toluene and the solution was treated in a similar way to Example 2. Dimethyl-(o-chloro-p-cyano-phenyl)-thiophosphate ester melting at 57–60° C. was obtained in a yield of 81%.

*Example 4*

The procedure of Example 3 was repeated, substituting p-chloro-o-cyano-phenol for o-chloro-p-cyano-phenol, and dimethyl - (p-chloro-o-cyano-phenyl)-thiophosphate ester, melting at 35–38° C., was obtained in the yield of 75%.

*Example 5*

The procedure of Example 3 was repeated, substituting diethyl monochlorothiophosphate and p-chloro-m-cyano-phenol respectively for dimethyl monochlorothiophosphate and o - chloro-p-cyano-phenol. Diethyl-(p-chloro-m-cyano-phenyl)-thiophosphate ester, boiling at 145–148° C./0.45 mm., was obtained in the yield of 78%.

*Example 6*

When the foregoing procedure was repeated using the following reactants and solvents under the following conditions respectively, the following compounds were obtained:

(1)

| | |
|---|---|
| m-Chloro-p-hydroxy-benzonitrile | 15 g. |
| Diethyl chlorophosphate | 19 g. |
| Sodium carbonate (anhydrous) | 10.6 g. |
| Methyl ethyl ketone | 100 cc. |
| Reaction temperature | 80–85° C. |
| Reaction period | 8 hours. |
| Product—Diethyl-(o-chloro-p-cyano-phenyl)-phosphate. | |
| Boiling point | 128–133° C./.01 mm. Hg. |
| Yield | 23 g. (85%). |

(2)

| | |
|---|---|
| m-Chloro-p-hydroxy-benzonitrile | 15 g. |
| Dimethyl chlorophosphate | 16 g. |
| Sodium carbonate (anhydrous) | 10.6 g. |
| Methyl ethyl ketone | 100 cc. |
| Reaction temperature | 80° C. |
| Reaction period | 8 hours. |
| Product—Diethyl-(o-chloro-p-cyano-phenyl)-phosphate. | |
| Boiling point | 141–145° C./0.5 mm./Hg. |
| Melting point | 60° C. |
| Yield | 15 g. (64%). |

(3)

| | |
|---|---|
| m-Chloro-o-hydroxy-benzonitrile | 15 g. |
| Diethyl chlorophosphate | 19 g. |
| Sodium carbonate (anhydrous) | 10.6 g. |
| Methyl ethyl ketone | 100 cc. |
| Reaction temperature | 75–85° C. |
| Reaction period | 8 hours. |
| Product—Diethyl-(p-chloro-o-cyano-phenyl)-phosphate. | |
| Boiling point | 141–144° C./0.04–0.5 mm. Hg. |
| Yield | 28 g. (93%). |

(4)

| | |
|---|---|
| m-Chloro-o-hydroxy-benzonitrile | 15 g. |
| Diethyl chlorophosphate | 16 g. |
| Sodium carbonate (anhydrous) | 10.6 g. |
| Methyl ethyl ketone | 100 cc. |
| Reaction temperature | 75–85° C. |
| Reaction period | 8 hours. |
| Product—Dimethyl-(p-chloro-o-cyano-phenyl)-phosphate. | |
| Boiling point | 140–146° C./0.6–0.65 mm. Hg. |
| Melting point | 33–34° C. |
| Yield | 11.8 g. (50%). |

Example 7

An emulsion consisting of

| | Percent |
|---|---|
| Diethyl-o-cyano - p - chloro - phenyl-thiophosphate ester | 45 |
| Alkyl-aryl-polyoxyethylene glycol | 25 |
| Xylene | 30 | was diluted with water to 3000–6000 times volume. The emulsion was 100% lethal to vegetable cockroaches within 5 hours.

Example 8

An insecticidal powder consisting of

| | Percent |
|---|---|
| Dimethyl - o - cyano - p - chloro - phenyl - thiophosphate ester | 1.5 |
| Talc | 98.5 | was 100% lethal to black rice bug (Scotinophora lurida) after 1 hour.

Example 9

A hydrated insecticide consisting of

| | Percent |
|---|---|
| Diethyl - p - cyano - o - chloro-phenyl - thiophosphate ester | 15 |
| Bentonite | 85 | was diluted with water to 100 times volume. It was 100% lethal to European corn borer (Pyrausta nubilaris) after 8 hours.

Example 10

A solution consisting of

| | Percent |
|---|---|
| Diethyl-m-cyano - p - chloro - phenylthiophosphate ester | 1 |
| Kerosene | 99 | was 100% lethal to American cockroach (Periplaneta americana) and house fly (Musca domestica vicina) in a short period of time.

What is claimed is:
1. A compound of the formula

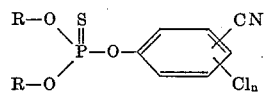

wherein R is lower alkyl, and n is an integer between one and two.

2. A compound of the formula

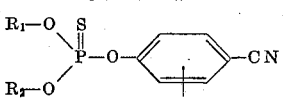

wherein $R_1$ and $R_2$ are lower alkyl.

3. A compound of the formula

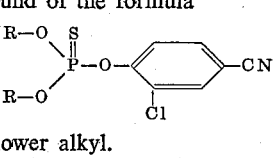

wherein R is lower alkyl.

4. A compound of the formula

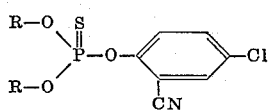

wherein R is lower alkyl.

5. The compound

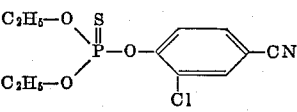

6. The compound

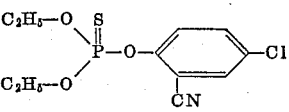

References Cited by the Examiner

UNITED STATES PATENTS 2,664,437  12/1953  Fletcher ........ 260—461.112
2,784,207  3/1957  Geoghegan et al. .. 260—461.112

OTHER REFERENCES

Fukuto et al., "J. Agri. Food Chem.," vol. 4, pp. 930–935 (1956).

Metcalf: "Organic Insecticides," Interscience Publishers, Inc. (1955), p. 292.

Schrader: "Die Entwicklung Neuer Insektizide Auf Grundlage Organischer Fluorund Phosphor-Verbindungen," Verlage Chemie G.m.b.H. (1952), p. 59.

CHARLES B. PARKER, Primary Examiner.

L. H. GASTON, M. LIEBMAN, I. MARCUS,
                                        Examiners.

F. N. SIKORA, Assistant Examiner.